(12) United States Patent
Murakami et al.

(10) Patent No.: US 6,589,078 B2
(45) Date of Patent: Jul. 8, 2003

(54) WATERPROOF CONNECTOR

(75) Inventors: Takao Murakami, Shizuoka-ken (JP); Masaru Fukuda, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/940,650

(22) Filed: Aug. 29, 2001

(65) Prior Publication Data

US 2002/0028108 A1 Mar. 7, 2002

(30) Foreign Application Priority Data

Sep. 4, 2000 (JP) ........................................ 2000-267647

(51) Int. Cl.[7] ................................................ H01R 13/40
(52) U.S. Cl. ........................................ 439/589; 439/274
(58) Field of Search ................................ 439/589, 587, 439/588, 274, 275, 279

(56) References Cited

U.S. PATENT DOCUMENTS

| | | | | |
|---|---|---|---|---|
| 4,832,615 A | * | 5/1989 | Thakrar et al. | 439/272 |
| 5,266,045 A | * | 11/1993 | Yamamoto et al. | 439/275 |
| 5,295,865 A | * | 3/1994 | Endo et al. | 439/271 |
| 5,573,429 A | * | 11/1996 | Miyazaki et al. | 439/587 |
| 5,709,563 A | * | 1/1998 | Saito | 439/275 |
| 5,997,349 A | | 12/1999 | Yoshioka | |
| 6,231,388 B1 | * | 5/2001 | Murakami et al. | 439/273 |
| 6,241,554 B1 | * | 6/2001 | Murakami et al. | 439/587 |

FOREIGN PATENT DOCUMENTS

JP          08298157          11/1996

* cited by examiner

*Primary Examiner*—Renee Luebke
*Assistant Examiner*—Edwin A. Léon
(74) *Attorney, Agent, or Firm*—Finnegan, Henderson, Farabow, Garrett, & Dunner, L.L.P.

(57) ABSTRACT

In a waterproof connector 19 includes a housing main body 21 having a plurality of terminal receiving chambers, a plurality of terminal inserting portions 23 and 23 formed in the housing main body 21 and to which terminals 5 having waterproof plugs 3 are respectively inserted, a plurality of common wall portions 25 respectively sectioning between adjacent portions in the plurality of terminal inserting portions 23 and 23, and taper surfaces 27 respectively provided in opening edges of the plurality of terminal inserting portions 23 and 23, and in which maximum diameter portions 39 of the taper surfaces 27 in the adjacent terminal inserting portions 23 and 23 are at least in contact on the common wall portion 25, a damage preventing portion 29 and 30 for preventing the waterproof plug 3 from being damaged at a time of inserting the terminals 5 to the terminal inserting portions 23 and 23 is provided in a portion in which the taper surfaces 27 and 27 of the adjacent terminal inserting portions 23 and 23 on the common wall portion 25 are in contact with each other.

6 Claims, 4 Drawing Sheets

WATERPROOF CONNECTOR

BACKGROUND OF THE INVENTION

1. Field of the Invention

The present invention relates to a waterproof connector which does not damage a waterproof plug at a time of receiving a terminal having the waterproof plug in a terminal receiving chamber.

2. Description of the Related Art

A related waterproof connector is provided with a housing main body having a plurality of terminal receiving chambers, and a plurality of terminal inserting portions formed in this housing main body. The related waterproof connector is structured such that a terminal assembled in an electric wire and having a waterproof plug is received within the terminal receiving chamber, and the waterproof plug is closely assembled on an inner peripheral surface of the terminal inserting portion, whereby a waterproof plug is applied to a portion between the electric wire and the inner peripheral surface of the terminal inserting portion.

The terminal inserting portions are formed by a tube-shaped body and are respectively extended from a plurality of terminal receiving chambers. These terminal inserting portions are integrally formed in a state that outer peripheral surfaces are in contact with each other, and are sectioned by common wall portions between the adjacent portions. Further, each of the terminal inserting portions is provided with a taper surface at an opening edge.

A terminal is inserted to the terminal inserting portion when the terminal is assembled in the waterproof connector. When the terminal is inserted into the terminal inserting portion at a predetermined position, the waterproof plug is brought into contact with the taper surface. When the terminal is inserted into the terminal inserting portion in this state, the waterproof plug slides along the taper surface in a contact manner so as to be guided within the terminal inserting portion. As a result, the terminal is received in the terminal receiving chamber, and the waterproof plug is closely attached to the inner peripheral surface of the terminal inserting portion.

In this case, in the related waterproof connector described above, the adjacent terminal inserting portions are integrally formed in a state that the outer peripheral surfaces are in contact with each other for the purpose of making compact, a thickness of the common wall portion is made thin, and a distance between the adjacent terminal inserting portions is made short.

Accordingly, there is a case that the taper surfaces in the adjacent terminal inserting portions are in contact with each other on the common wall portion and an edge portion having an acute angle is formed on the common wall portion due to the taper surface. In this case, the waterproof plug is brought into contact with the edge portion so as to be damaged at a time when the terminal is inserted to the terminal inserting portion, so that there is a risk that it is impossible to waterproof between the electric wire and the terminal inserting portion.

Moreover, when a size of the taper surface is made small so that the taper surfaces in the adjacent terminal inserting portions are not in contact with each other on the common wall portion, there is a problem that a guiding performance of guiding the terminal on the taper surface to the terminal inserting portion is reduced and it takes a lot of trouble with an assembling operation of the terminal in the waterproof connector.

SUMMARY OF THE INVENTION

An object of the present invention is to provide a waterproof connector which can prevent a waterproof plug from being damaged by an edge portion at a time of inserting a terminal to a terminal inserting portion so as to securely waterproof between an electric wire and a terminal inserting portion, and does not reduce an operability of assembling the terminal.

In order to achieve the object described above, according to a first aspect of the present invention, there is provided a waterproof connector comprising a housing main body having a plurality of terminal receiving chambers; a plurality of terminal inserting portions formed in the housing main body, extended from the plurality of terminal receiving chambers and to which terminals assembled in electric wires and having waterproof plugs are respectively inserted; a plurality of common wall portions respectively sectioning between adjacent portions in the plurality of terminal inserting portions; and taper surfaces respectively provided in opening edges of the plurality of terminal inserting portions and guiding the terminals to the terminal inserting portions, and maximum diameter portions of the taper surfaces in the adjacent terminal inserting portions are at least in contact on the common wall portion, wherein the waterproof connector is provided with a damage preventing portion formed in a portion in which the taper surfaces of the adjacent terminal inserting portions on the common wall portion are in contact with each other, and prevents the waterproof plug from being damaged at a time of inserting the terminals to the terminal inserting portions.

According to the first aspect of the present invention structured in the manner described above, when the terminals assembled in the electric wires and having the waterproof plugs are inserted into the terminal inserting portions, the waterproof plugs are brought into contact with the taper surface. In this state, when the terminals are inserted to the terminal inserting portions, the waterproof plugs slide along the taper surface in a contact manner so as to be guided within the terminal inserting portions. When the terminals are received within the terminal receiving chambers, the outer peripheral surfaces of the waterproof plugs are closely attached to the inner peripheral surfaces of the terminal inserting portions.

Moreover, in the case that the terminals are inserted to the terminal inserting portions in a state that a whole of them is slanted to a side of the common wall portion, the waterproof plugs are brought into contact with the common wall portion. At this time, the waterproof plugs can be prevented by the damage preventing portion from being damaged even when the waterproof plugs are brought into contact with the portion that the taper surfaces in the adjacent terminal inserting portions of the common wall portion are in contact with each other.

Moreover, in the waterproof connector described above, the damage preventing portion may be constituted by a concave step portion in which an inner peripheral surface forms an acute angle with respect to the taper surface.

According to the waterproof connector structured in the manner described above, in the case that the terminals are inserted to the terminal inserting portions in a state that a whole of them is slanted to a side of the common wall portion, the waterproof plugs are brought into contact with the common wall portion. At this time, apart of the waterproof plugs are brought into contact with the inner peripheral surface of the step portion formed on the common wall portion.

Moreover, the damage preventing portion may be formed by a curved surface connecting the taper surfaces of the adjacent terminal inserting portions to each other.

According to the waterproof connector structured in the manner mentioned above, in the case that the terminals are inserted to the terminal inserting portions in a state that a whole of them is slanted to a side of the common wall portion of the terminal inserting portions, the waterproof plugs are brought into contact with the common wall portion. At this time, a part of the waterproof plugs are brought into contact with the curved surface formed on the common wall portion.

DETAILED DESCRIPTION OF THE PREFERRED EMBODIMENT

Hereinafter, a description will be given of embodiments of a waterproof connector according to the present invention with reference to the accompanying drawings.

<First Embodiment>

Figure 1:
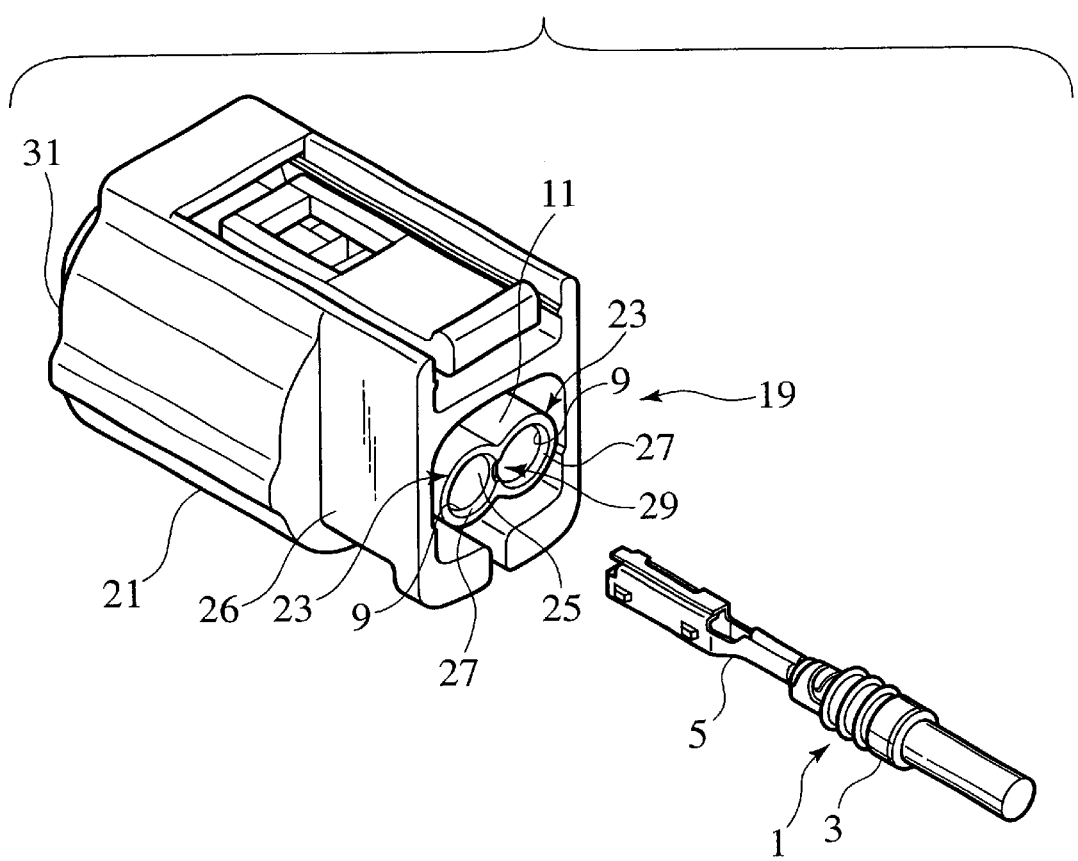
FIG. 1 is a perspective view showing a first embodiment of a waterproof connector according to the present invention.
Figure 2:
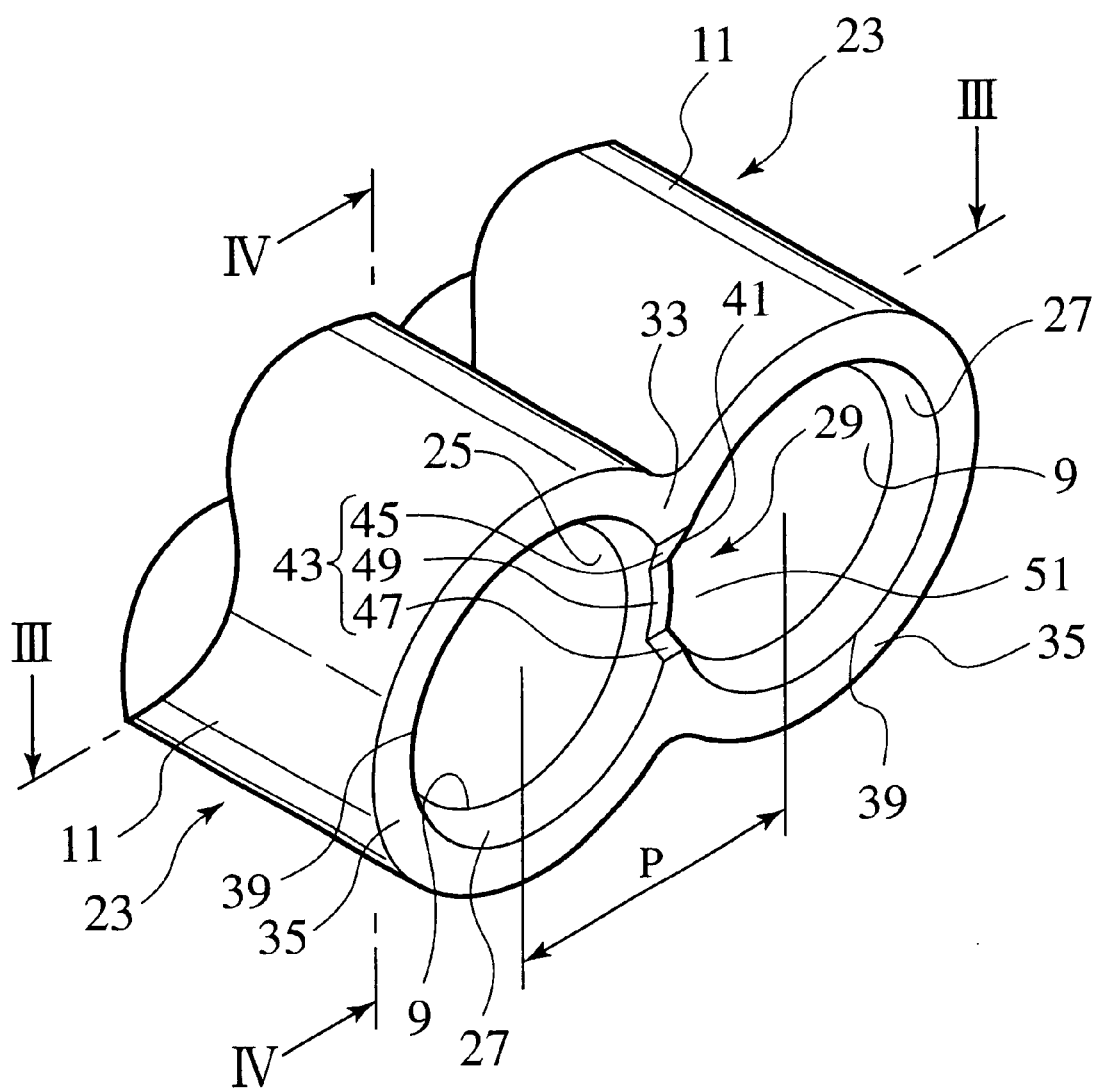
FIG. 2 is a perspective view of a terminal inserting portion of the waterproof connector shown in FIG. 1.
Figure 3:
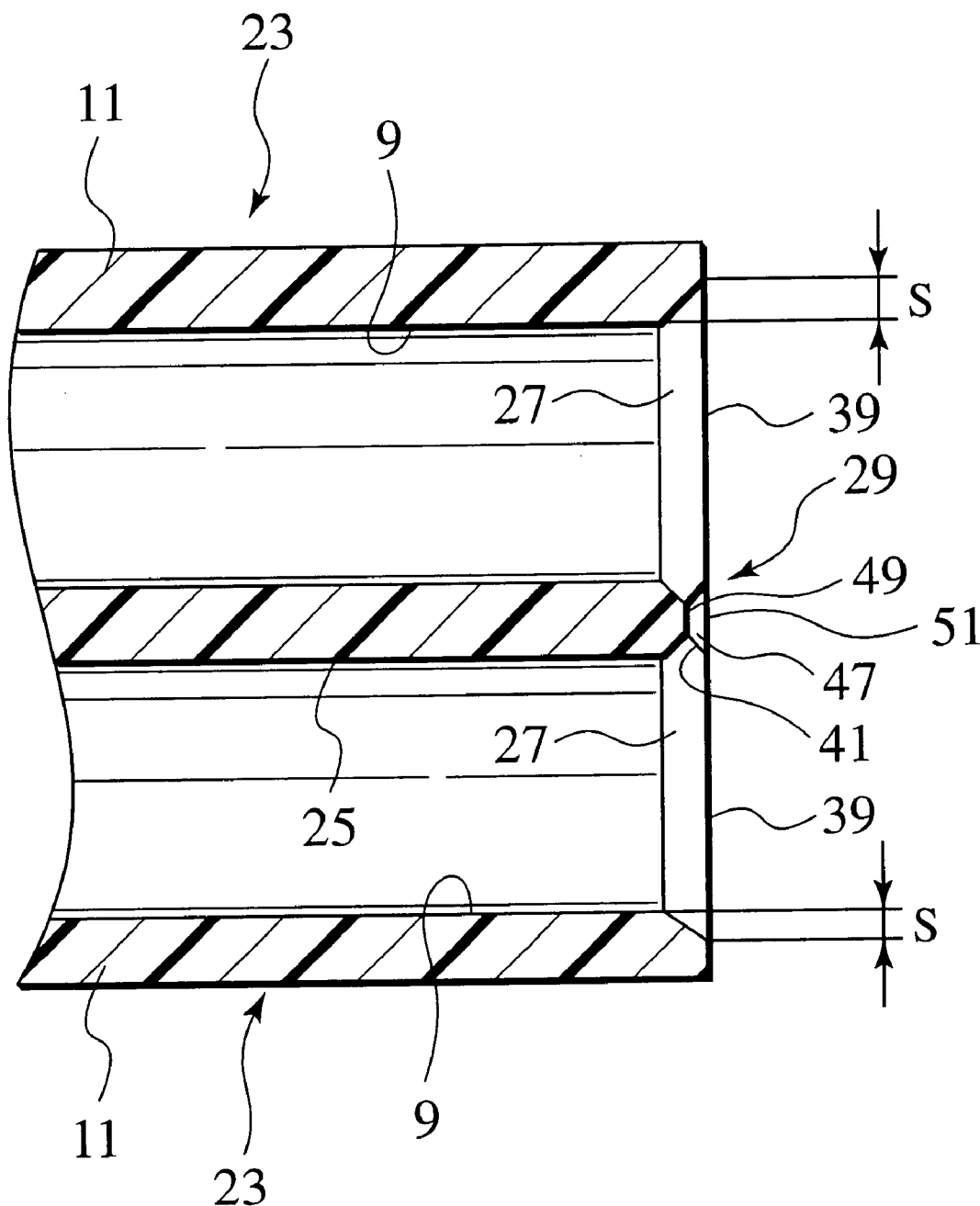
FIG. 3 is a sectional view taken along a line III—III of the terminal inserting portion shown in FIG. 2.
Figure 4:
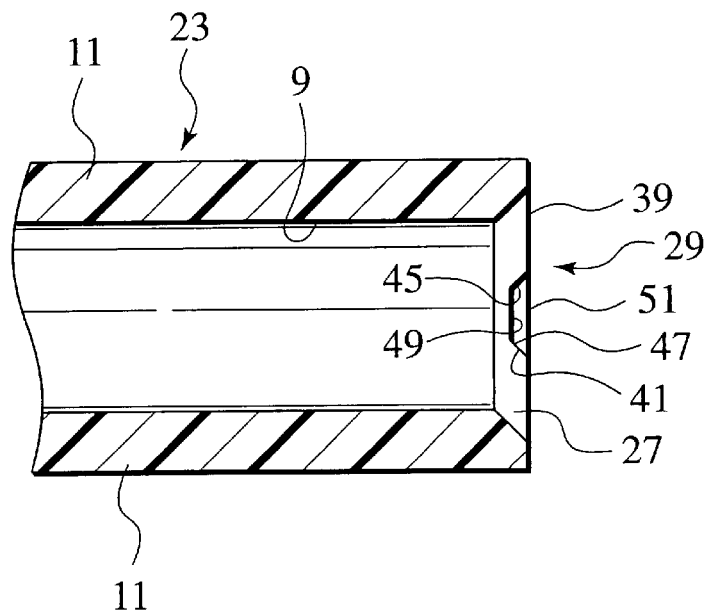
FIG. 4 is a sectional view taken along a line IV—IV of the terminal inserting portion shown in FIG. 2.

FIG. 1 is a perspective view showing a first embodiment of a waterproof connector according to the present invention. FIG. 2 is a perspective view of a terminal inserting portion of the waterproof connector shown in FIG. 1. FIG. 3 is a sectional view taken along a line III—III of the terminal inserting portion shown in FIG. 2. FIG. 4 is a sectional view taken along a line IV—IV of the terminal inserting portion shown in FIG. 2.

As shown in FIG. 1, a waterproof connector comprises a housing main body 21, a plurality of terminal inserting portions 23 and 23 formed in the housing main body 21, a common wall portion 25 sectioning the respective terminal inserting portions 23 and 23, taper surfaces 27 and 27 respectively provided in opening edges of a plurality of terminal inserting portions 23 and 23, and a damage preventing portion 29 formed in the common wall portion. In the housing main body 21, a plurality of terminal receiving chambers (not shown) are provided in parallel to each other therewithin, and a terminal 5 is received in each of a plurality of terminal receiving chambers. Moreover, the housing 21 has a fitting portion 31 fitted to a mating housing main body (not shown) in one side, and a plurality of terminal inserting portions 23 are integrally formed in another side of the housing 21.

A plurality of terminal inserting portions 23 and 23 are, as shown in FIGS. 1 and 2, respectively formed in a tube shape, and are extended from the terminal receiving chambers so as to protrude outward from another side of the housing main body. These terminal inserting portions 23 and 23 are structured such that a waterproof plug 3 is closely attached to an inner peripheral surface 9 in the terminal inserting portions 23 and 23 in a state that a terminal 5 is received in the terminal receiving chamber. Moreover, the terminal inserting portions 23 and 23 are integrally formed in a state that adjacent outer peripheral surfaces 11 are in contact with each other, and sectioned with each other by the common wall portion 25. The common wall portion 25 is formed so that an end surface 33 is flush with an end surface 35 of the terminal inserting portion 23. The terminal inserting portions 23 and 23 formed in this manner are covered by a tube-shaped wall portion 26 in a periphery of the outer peripheral surface 11.

As described above, the taper surfaces 27 and 27 respectively formed along the opening edges of a plurality of terminal inserting portions 23 and 23 are formed by a bowl-shaped annular slant face. These taper surfaces 27 and 27 are structured such that a diameter thereof becomes gradually larger from the inner peripheral surfaces 9 and 9 of the terminal inserting portions 23 and 23 toward the opening edge sides of the terminal inserting portions 23 and 23, and form maximum diameter portions 39 having the largest diameter at the opening edges. Moreover, the taper surfaces 27 and 27 of the adjacent terminal inserting portions 23 and 23 are formed so that the maximum diameter portions 39 are in contact with each other on an end surface 33 of the common wall portion 25. A damage preventing portion 29 is provided in a portion in which the taper surfaces 27 of the adjacent terminal inserting portions 23 are in contact with each other on the end surface 33 of the common wall portion 25.

The damage preventing portion 29 is, as shown in FIGS. 2 to 4, constituted by a concave step portion 41, and is formed in a state the portion in which the taper surfaces 27 and 27 are in contact with each other on the end surface 33 of the common wall portion 25 is notched. The step portion 41 is connected to each of the respective taper surfaces 27 and 27 of the terminal inserting portions 23 and 23 adjacent in both sides in a width direction of the inner peripheral surface 43.

The inner peripheral surface 43 of the step portion 41 respectively forms an obtuse angle together with the taper surfaces 27 and 27, and is constituted by a pair of slant faces 45 and 47 and a bottom surface 49. The slant faces 45 and 47 are, as shown in FIGS. 2 and 4, formed in a flat shape, and are provided in an upper portion and a lower portion in a mating manner. The upper slant face 45 is structured such that one side is connected to the end surface 33 of the common wall portion 25, and another side is arranged inside the terminal inserting portion 23 with respect to the opening edge of the terminal inserting portion 23. The upper slant face 45 is structured such that another side is arranged to be lower with respect to one side so as to form an obtuse angle with respect to the end surface 33 of the common wall portion 25. Moreover, the lower slant face 47 is structured such that one side is connected to the end surface 33 of the common wall portion 25, and another side is arranged inside the terminal inserting portion 23 with respect to the opening edge of the terminal inserting portion 23. The lower slant face 47 is structured such that another side is arranged to be upper with respect to one side so as to form an obtuse angle with respect to the end surface 33 of the common wall portion 25. These slant faces 45 and 47 are connected by the bottom surface 49.

The bottom surface 49 is formed in a flat shape, and both sides in a vertical direction are connected to the another sides of the slant faces 45 and 47 so as to respectively form the obtuse angles with respect to the slant faces 45 and 47. The bottom surface 49 is formed in an arc shape so that both sides in the width direction respectively profile the shapes of the terminal inserting portions 23 and 23.

At a time of assembling a waterproof connector 19 formed in the manner mentioned above, at first, the terminal 5 is received within the terminal receiving chamber, whereby the terminal 5 is set in a state of being assembled in the housing main body 21, and thereafter, the housing main body 21 is fitted and connected to the mating housing main body (not shown).

At a time of receiving the terminal 5 in the terminal inserting portion 23, the terminal 5 is arranged near the terminal inserting portion 23, and a front end of the terminal is aligned with an opening edge of the terminal inserting portion 23. Further, a cross sectional shape of the waterproof plug 3 is coincided with the opening edge of the terminal inserting portion 23, whereby the terminal 5 is set in a positioned state.

When the terminal 5 is inserted within the terminal inserting portion 23 until a predetermined position, the waterproof plug 3 is brought into contact with the taper surface 27. At this time, in the case that the positioned state of the terminal 5 is cancelled and the terminal 5 is slanted to the side of the common wall portion 25 as a whole, when the terminal 5 is inserted within the terminal inserting portion 23 until the predetermined position, the waterproof plug 3 is brought into contact with the end surface 33 of the common wall portion 25 so as to be bent, and a part of the waterproof plug 3 is brought into contact with the inner peripheral surface 43 of the step portion 41.

When the waterproof plug 3 is brought into contact with the end surface 33 of the common wall portion 25, the waterproof plug 3 becomes in a state of bridging over an opening port 51 of the step portion 41. In this case, when a force in an inserting direction is applied to the terminal 5, a part of the waterproof plug 3 is bent and the bent portion slides along the slant faces 45 and 47 in a contact manner from the opening 51 so as to expand out within the step portion 41. At this time, since the slant faces 45 and 47 form an obtuse angle with respect to the common wall portion 25, and the slant faces 45 and 47 and the bottom surface 49 form an obtuse angle, the step portion 41 does not damage the waterproof plug 3.

Here, when a force in an inserting direction is further applied to the terminal 5, the waterproof plug 3 expanding out within the step portion 41 from the opening 51 is brought into contact with the bottom surface 49 so as to restrict an insertion of the terminal 5 into the terminal inserting portion 23.

In this state, when moving the terminal 5 as a whole in a direction of coinciding the cross sectional shape of the waterproof plug 3 with the opening edge of the terminal inserting portion 23, the waterproof plug 3 is brought into contact with the taper surface 27. At this time, since the slant faces 45 and 47 and the bottom surface 49 form an obtuse angle with respect to the taper surfaces 27 and 27, the waterproof plug 3 is not damaged by the portion in which the slant faces 45 and 47 and the bottom surface 49 are in contact with the taper surfaces 27 and 27.

When the terminal 5 is inserted to the terminal inserting portion 23, the waterproof plug 3 slides along the taper surface 27 in a contact manner so as to be guided within the terminal inserting portion 23, and the insertion of the terminal 5 to the terminal inserting portion 23 is guided by the taper surface 27. Accordingly, the terminal 5 is received within the terminal receiving chamber, and the waterproof plug 3 is closely attached to the inner peripheral surface 9 of the terminal inserting portion 23 and becomes in a state of assembling the terminal 5 in the housing main body 21.

Thereafter, the mating housing main body (not shown) is fitted and connected to the fitting portion 31 of the housing main body 21, thereby conducting and connecting the terminal 5 of the housing main body 21 with the terminal of the mating housing main body.

As described above, in the waterproof connector 19 according to the present embodiment, the step portion 41 is formed in the portion in which the taper surfaces 27 and 27 of the adjacent terminal inserting portions 23 and 23 on the end surface 33 of the common wall portion 25 are in contact with each other. Accordingly, in the case that the terminal 5 is slanted to the side of the common wall portion 25 as a whole, the terminal 5 is brought into contact with the inner peripheral surface 43 of the step portion 41, whereby the waterproof plug 3 is prevented from being damaged by the edge portion at a time of inserting the terminal 5 into the terminal inserting portion 23 which is caused in the related art.

Accordingly, in a state that the terminal 5 is assembled in the waterproof connector 19, the waterproof plug 3 is closely attached to the inner peripheral surface 9 so as to waterproof between the electric wire 1 and the terminal inserting portion 23 by the waterproof plug 3.

Moreover, since the step portion 41 is formed in the portion in which the taper surfaces 27 and 27 of the adjacent terminal inserting portions 23 and 23 on the end surface 33 of the common wall portion 25 are in contact with each other, it is possible to prevent the edge portion from being formed on the end surface 33 of the common wall portion 25 without reducing a size S of the taper surfaces 27 and 27 which is caused in the related art. Accordingly, in the waterproof connector 19 according to the present embodiment, it is possible to prevent an operability of assembling the terminal 5 from being reduced without reducing a guiding performance of the terminal 5 to the terminal inserting portions 23 and 23 by the taper surface 27 and 27.

Further, it is possible to freely set the size S of the taper surface 27, and it is possible to improve an assembling operability of the terminal 5 by setting the size S of the taper surfaces 27 and 27 to an appropriate size.

In this case, in the present embodiment, the structure is made such that the maximum diameter portions 39 and 39 of the taper surface 27 and 27 in the adjacent terminal inserting portions 23 and 23 are in contact with each other on the end surface 33 of the common wall portion 25, however, the structure is made such that portions between the maximum diameter portions 39 and 39 of the taper surfaces 27 and 27 and minimum diameter portions are in contact with each other on the end surface 33 of the common wall portion 25.

In the embodiment mentioned above, the damage preventing portion 29 is formed by the concave step portion 41, however, may be formed by a curved surface.

<Second Embodiment>

Figure 5:
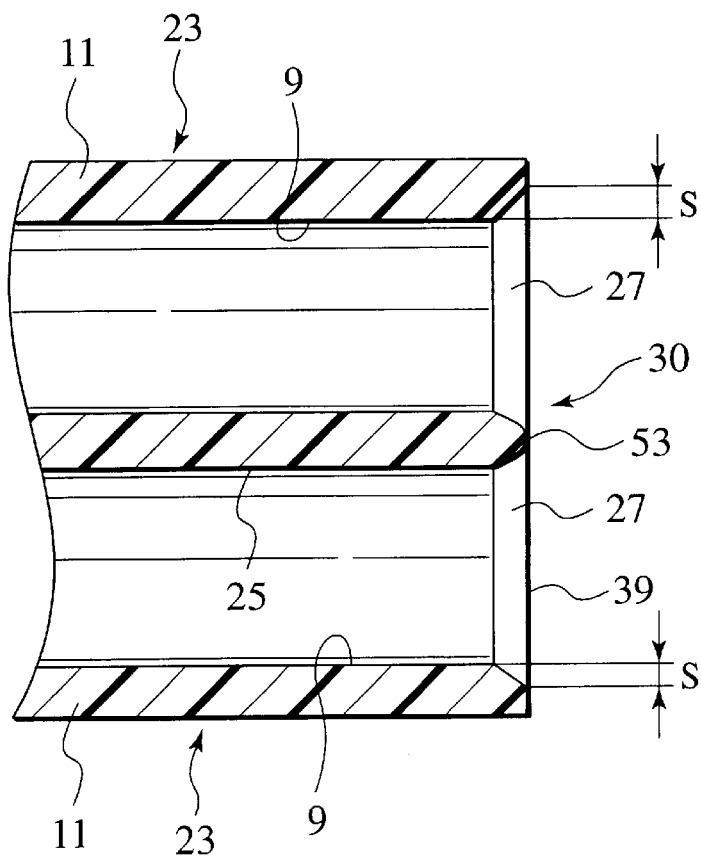
FIG. 5 is a sectional view showing a second embodiment of a waterproof connector according to the present invention.

Hereinafter, a description will be given of a second embodiment according to the present invention with reference to FIG. 5. In this case, the same reference numerals are attached to the same elements as those of the embodiment described above, and an overlapping description will be omitted. FIG. 5 is a sectional view showing a second embodiment of a waterproof connector 19 according to the present invention.

The waterproof connector 19 comprises a housing main body 21, a plurality of terminal inserting portions 23 formed in the housing main body 21, a common wall portion 25 sectioning the respective terminal inserting portions 23, taper surfaces 27 respectively provided in opening edges of a plurality of terminal inserting portions 23, and a damage preventing portion 30 formed in the common wall portion 23.

The damage preventing portion 30 is constituted by a curved surface 53, as shown in FIG. 5. The curved surface 53 is structured such that both sides in a width direction are connected to the taper surfaces 27 and 27 of the adjacent terminal inserting portions 23 and 23, and connect the taper surfaces 27 and 27 to each other. Moreover, the curved surface 53 is structured such that a middle portion in the width direction is formed on substantially the same plane as the end surface 33 of the common wall portion 23, and both sides in the vertical direction are connected to the end surface 33 of the common wall portion 25.

At a time of assembling the waterproof connector 19 formed in this manner, at first, the terminal 5 is set to a state of being assembled in the housing main body 21, and thereafter, the housing main body 21 is fitted and connected to the mating housing main body (not shown).

When assembling the terminal 5 in the housing main body 21, the terminal 5 is inserted to the terminal inserting portion 23 so as to receive the terminal 5 within the terminal receiving chamber.

When the terminal 5 is inserted within the terminal inserting portion 23 until a predetermined position, the waterproof plug 3 is brought into contact with the taper surface 27. At this time, in the case that the terminal 5 is slanted to the side of the common wall portion 25 as a whole, when the terminal 5 is inserted within the terminal inserting portion 23 until the predetermined position, the waterproof plug 3 is brought into contact with the end surface 33 of the common wall portion 25, and a part of the waterproof plug 3 is brought into contact with a middle portion of the curved surface 53.

Here, when a force is applied to the terminal 5 in an inserting direction to the terminal inserting portion 23, the waterproof plug 3 is bent and slides along the curved surface 53 in a contact manner. Accordingly, the terminal 5 moves in a center side of the terminal inserting portion 23 as a whole, and the waterproof plug 3 is brought into contact with the taper surface 27. In this state, when inserting the terminal 5 within the terminal inserting portion 23, the waterproof plug 3 slides along the taper surface 27 in a contact manner so as to be guided within the terminal inserting portion 23, whereby the terminal 5 is received within the terminal receiving chamber, and the waterproof plug 3 is closely attached to the inner peripheral surface 9 of the terminal inserting portion 23 and becomes in a state of assembling the terminal 5 in the housing main body 21.

As described above, in the waterproof connector 19 according to the present embodiment, the curved surface 53 is formed in the portion in which the taper surfaces 27 and 27 of the adjacent terminal inserting portions 23 and 23 on the end surface 33 of the common wall portion 25 are in contact with each other. Accordingly, in the case that the terminal 5 is inserted to the terminal inserting portion 23 in a state of being slanted to a side of the common wall portion 25 as a whole, the terminal 5 is brought into contact with the curved surface 53 and it is possible to prevent the waterproof plug 3 from being damaged by the edge portion at a time of inserting the terminal 5 to the terminal inserting portion 23 which is caused in the related art.

Accordingly, in a state that the terminal 5 is assembled in the waterproof connector 19, the waterproof plug 3 is closely attached to the inner peripheral surface 9 of the terminal inserting portion 23 so as to waterproof between the electric wire 1 and the terminal inserting portion 23 by the waterproof plug 3.

Moreover, since the curved surface 53 is formed in the portion in which the taper surfaces 27 and 27 of the adjacent terminal inserting portions 23 and 23 on the end surface 33 of the common wall portion 25 are in contact with each other, it is possible to prevent the edge portion from being formed on the end surface 33 of the common wall portion 25 without reducing a size S of the taper surfaces 27 and 27 which is caused in the related art. Accordingly, it is possible to prevent an operability of assembling the terminal 5 from being reduced without reducing a guiding performance of the terminal 5 to the terminal inserting portions 23 and 23 by the taper surface 27 and 27.

Further, it is possible to freely set the size S of the taper surface 27, and it is possible to improve an assembling operability of the terminal 5 by setting the size S of the taper surfaces 27 and 27 to an appropriate size.

Moreover, in the waterproof connector 19 according to the present embodiment, in the case that the terminal is inserted in a state of being slanted to the side of the common wall portion 25 as a whole, a part of the waterproof plug 3 is brought into contact with the middle portion of the curved surface 53 so as to be bent and slide along the curved surface 53 in a contact manner. Accordingly, the terminal 5 moves to the center side of the terminal inserting portion 23 as a whole and the waterproof plug 3 is guided within the terminal inserting portion 23 by the taper surface 27.

Accordingly, even when the terminal 5 is inserted in a state of being slanted to the side of the common wall portion 25, it is possible to securely receive the terminal 5 within the terminal receiving chamber only by applying a force in the inserting direction of the terminal 5 into the terminal inserting portion 23, whereby it is possible to improve an operability of assembling the terminal 5 in the waterproof connector 19.

What is claimed is:

1. A waterproof connector comprising:

a plurality of terminal receiving chambers;

a housing main body having the plurality of terminal receiving chambers;

a plurality of terminal inserting portions formed in the housing main body, extended from the plurality of terminal receiving chambers and to which terminals assembled in electric wires and having waterproof plugs are respectively inserted;

a plurality of common wall portions respectively sectioning between adjacent portions in the plurality of terminal inserting portions; and taper surfaces respectively provided in opening edges of the plurality of terminal inserting portions and guiding the terminals to the terminal inserting portions; and maximum diameter portions of the taper surfaces in the adjacent terminal inserting portions are at least in contact on the common wall portion, wherein the waterproof connector is provided with a damage preventing portion formed by a concave step portion in a portion in which the taper surfaces of the adjacent terminal inserting portions on the common wall portion are in contact with each other, and prevents the waterproof plug from being damaged at a time of inserting the terminals to the terminal inserting portions.

2. A waterproof connector according to claim 1, wherein the damage preventing portion is formed by a curved surface connecting the taper surfaces of the adjacent terminal inserting portions to each other.

3. A waterproof connector according to claim 1, wherein a fitting portion fitting to a mating housing main body is provided in an opposite side to the terminal inserting portion, in the housing main body.

4. A waterproof connector according to claim 1, wherein the taper surface is formed by a bowl-shaped annual slant face.

5. A waterproof connector according to claim 1, wherein the concave step portion of the damage preventing portion comprises a pair of slant faces formed on a flat surface; and a bottom surface formed on a plane connected to the pair of slant faces, and the pair of slant faces form an obtuse angle with respect to the common wall portion and the bottom surface.

6. A waterproof connector according to claim 5, wherein the pair of slant faces and the bottom surface form an obtuse angle with respect to the taper surface.

* * * * *

UNITED STATES PATENT AND TRADEMARK OFFICE
CERTIFICATE OF CORRECTION

PATENT NO. : 6,589,078 B2
DATED : July 8, 2003
INVENTOR(S) : Takao Murakami and Masaru Fukuda It is certified that error appears in the above-identified patent and that said Letters Patent is hereby corrected as shown below:

<u>Title page, Item [54] and Column 1, line 1,</u>
Before "WATERPROOF CONNECTOR" insert -- A DAMAGE PREVENTING --.

<u>Column 9,</u>
Line 6, "annual slant" should read -- annular slant --.

Signed and Sealed this

Sixth Day of January, 2004

JAMES E. ROGAN
*Director of the United States Patent and Trademark Office*